(12) United States Patent
Leroux (10) Patent No.: US 12,243,259 B2
(45) Date of Patent: Mar. 4, 2025

(54) DEFINING FOCAL REGIONS OF IMAGES BASED ON IMAGE METADATA

(71) Applicant: Shopify Inc., Ottawa (CA)

(72) Inventor: Stephan Leroux, East Gwillimbury (CA)

(73) Assignee: Shopify Inc., Ottawa (CA)

( * ) Notice: Subject to any disclaimer, the term of this patent is extended or adjusted under 35 U.S.C. 154(b) by 355 days.

(21) Appl. No.: 17/814,064

(22) Filed: Jul. 21, 2022

(65) Prior Publication Data

US 2024/0029294 A1   Jan. 25, 2024

(51) Int. Cl.
*G06T 7/11* (2017.01)
*G06F 3/04845* (2022.01)
*G06F 40/117* (2020.01)
*G06T 3/40* (2006.01)
*G06T 7/73* (2017.01)
*G06T 11/00* (2006.01)

(52) U.S. Cl.
CPC ............ *G06T 7/73* (2017.01); *G06F 3/04845* (2013.01); *G06F 40/117* (2020.01); *G06T 3/40* (2013.01); *G06T 7/11* (2017.01); *G06T 11/00* (2013.01); *G06T 2200/24* (2013.01); *G06T 2207/20081* (2013.01); *G06T 2207/20132* (2013.01)

(58) Field of Classification Search
CPC ..... G06T 7/73; G06T 7/11; G06T 3/40; G06T 11/00
See application file for complete search history.

(56) References Cited

U.S. PATENT DOCUMENTS

2017/0337692 A1   11/2017  Romanenko et al.
2021/0021900 A1    1/2021  Kansara et al.

FOREIGN PATENT DOCUMENTS

WO    2014/025897    2/2014

OTHER PUBLICATIONS

Co-Pending PCT Application, International Search Report mailed Sep. 13, 2023, International Application No. PCT/CA2023/050864, 10 pages.

*Primary Examiner* — Sam Bhattacharya
(74) *Attorney, Agent, or Firm* — Perkins Coie LLP (57) ABSTRACT

An image processing system accesses an image depicting a particular object. The system identifies a location of the particular object within the image and defines, based on the identified location of the particular object within the image, a focal region of the image. The focal region can be used to modify the image for delivery and presentation on a webpage or software application.

20 Claims, 8 Drawing Sheets

DEFINING FOCAL REGIONS OF IMAGES BASED ON IMAGE METADATA

TECHNICAL FIELD

The present disclosure generally relates to automated image analysis, and, in particular embodiments, to automatically defining focal regions of images based on metadata associated with images.

BACKGROUND

Many websites and software applications are accessed on a wide variety of computing devices with different display sizes and capabilities. To ensure that the user experience of these websites and applications is consistent across the various types of devices that may be used to access their content, many webpages or applications will resize the content on the page or modify its layout to better fit the size and shape of the display of the device that accessed the content. Such content modification can include modifications to images within the webpage or application, such as resizing the image, zooming into or out from the image, or stretching the image to modify its aspect ratio.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications

DETAILED DESCRIPTION

The disclosed technology includes a computer-implemented technique for automatically defining a focal region of an image to include a target object in the image. The image is modified based on the focal region and the modified image is presented on a webpage and/or application. The method reduces the likelihood that the target object (e.g., a product) will not be the focus of the modified image or will be cropped from the delivered image, without requiring manual user input to define the location of the target object.

An image can be associated with textual metadata that describes or is otherwise associated with the target object in the image. In one example, a product image uploaded to an online platform includes textual metadata such as a product title, product description, and/or product category, which may contain descriptors that can be leveraged by the automated method to identify the location of the object in the image that corresponds to the product. For example, the metadata associated with the image is analyzed using a natural language processing model, which outputs one or more features of the target object. Example features include a type of the object, a color of the object, a size or shape of the object, and/or a type of the image (e.g., on-model or off-model). The one or more features are then input to an object detection model, which identifies a location of the target object in the image based on the received feature(s).

A focal region within the image is then defined based on the identified location of the object. For example, the focal region can correspond to a region of the image that is coextensive with the identified location of the target object, a region of the image that is centered on and includes the identified location of the target object, a region of the image that includes a margin around the centered object, a region of the image that includes the target object and another item of interest, a region of the image that includes the target object and other items in the image, etc. The image is modified based on the focal region, and then the modified image is delivered for presentation on a webpage and/or application.

Examples described herein include modifications to an image that are processed in advance of accessing a webpage or application on which the image is to be presented (e.g., such that a few different versions of an image are stored before the webpage is accessed), as well as modifications that occur in real-time when the webpage or application is accessed. In light of these examples, types of modifications that make use of a focal region may include: cropping the image to fit a specified aspect ratio; modifying the image to fit a theme of a website or webpage (such as gravity, fill type, or object location within the modified image); defining an initial window for a pannable image; and/or applying a zoom function to the image. In some implementations, a preview image showing the focal region can be displayed to a user for feedback. If the user modifies the focal region (increasing or decreasing the size, adjusting the framing of the object, etc.), the feedback can be used to retrain the object detection model.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Automatically Defining Image Focal Regions

Websites and software applications often contain images. When the website or application is accessed on an end user's computing device, constraints imposed by the particular display configurations of the device result in images sometimes needing to be modified from their original form to fit different aspect ratio or position requirements. When an image depicts a particular object along with contextual objects and/or other items in addition to the particular object, it is often desirable for the particular object to be included in any modified version of the image that is generated. To reduce the likelihood that a particular object will not be the focus of a modified image or will be cut out of the delivered image, described herein is a process for automatically defining a focal region of an image. The focal region, which is a portion of an image that is defined in relation to the location of a particular object identified in the image, is used to modify the image for delivery to and presentation on a webpage or application.

Embodiments of the focal region definition and image modification techniques described herein can be used in any of a variety of website or application environments. For example, an advertising network can automatically process any images in advertisements before sending the modified advertisements for display via an ad publisher using techniques similar to those described herein. In another example, a vacation rental platform can automatically process any images of the rental property to ensure that the images contain particular objects of interest (e.g., a front door, a bed, or a pool) when the images are displayed to end users, and a website listing products for sale can automatically process any images of the product to ensure that the displayed images contain products of interest. Furthermore, techniques described herein can be used to generate images that are displayed via websites or any of a variety of types of software applications, including applications configured for display on mobile devices, desktop computing devices, televisions, smart watches, headsets, etc.

Figure 1:
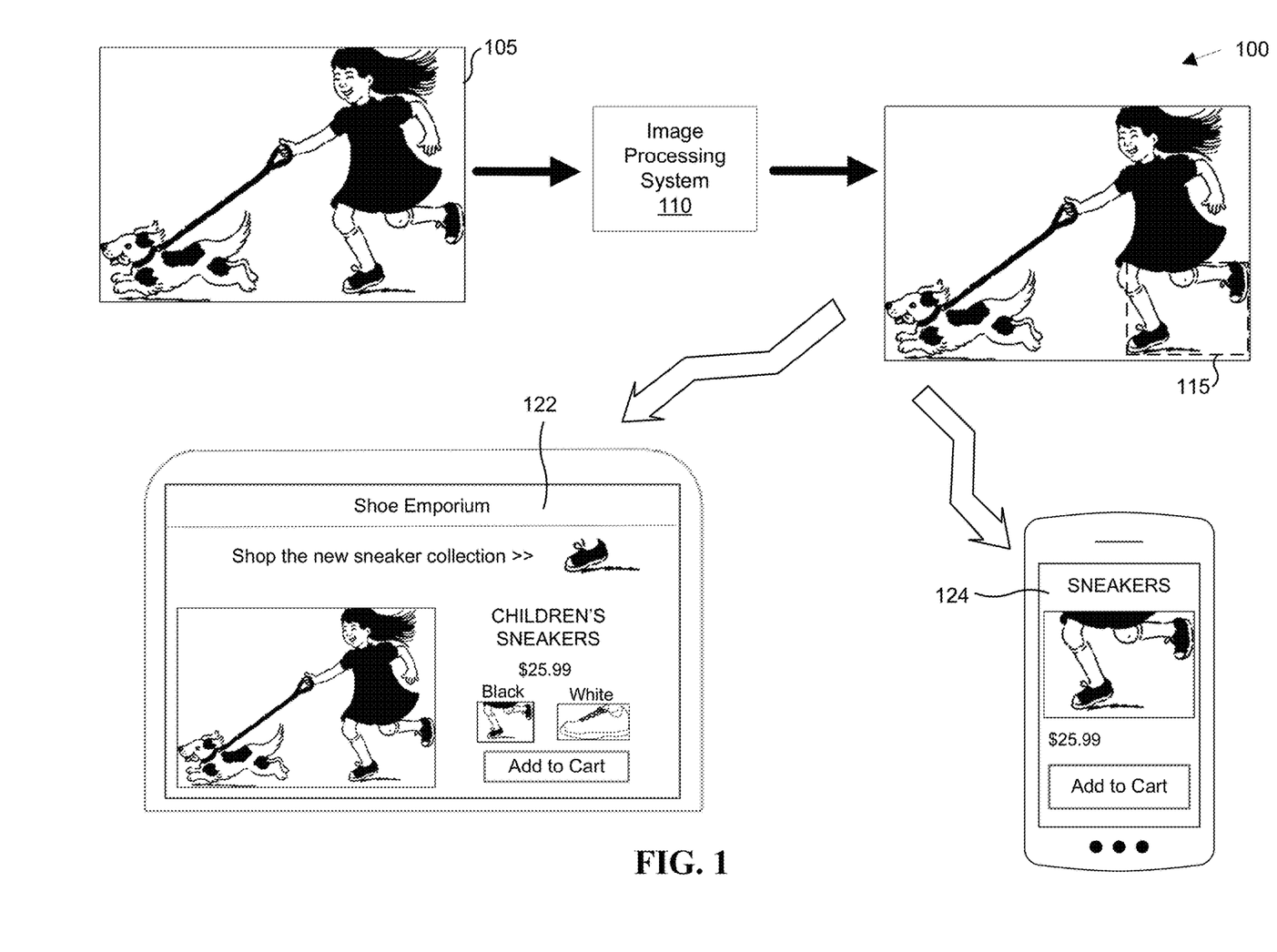
FIG. 1 illustrates an example environment in which images are automatically modified for presenting on a webpage or software application

FIG. 1 illustrates an example environment 100 in which images are automatically modified for delivery and presentation on a website or software application. In the environment 100, users upload images to an image processing system 110. The image processing system 110 analyzes the uploaded images and generates information for modifying images such that they can be displayed on a webpage or within an application according to various constraints imposed by the particular end user devices that are displaying the images. In some implementations, the image processing system 110 is part of a platform that facilitates operations of websites or applications. For example, the image processing system 110 can be part of or used in association with a system that provides users with tools to build and maintain websites. The image processing system 110 can be implemented in a distributed computing environment or in a cloud computing environment, in which functionality of the image processing system 110 is distributed across multiple computing devices, core cloud servers, and/or edge servers. Additionally or alternatively, at least some functionality of the image processing system 110 can be implemented on a client device. In some implementations, some or all functionality of the image processing system 110 can be executed by client devices used by users to upload images for distribution via websites or applications. In other implementations, functionality of the image processing system 110 can be executed by client devices used to access and display websites or applications with processed images.

In the example illustrated in FIG. 1, a merchant of children's shoes uploads an original image 105 of the shoes being worn by a child as she runs after her dog. When the image is served to a user device via a webpage 122 or application 124, the image may be modified. For example, the displayed image may have a different aspect ratio than the original image. If the image is naively modified to create the displayed image, the object of interest in the image (the shoes) may be partially or entirely cut out of the displayed image. Naïve modification of the image 105 may result in, for example, a modified image that shows only the dog, a modified image that displays primarily empty background, or a modified image that displays only part of a shoe.

To ensure that a displayed image focuses on an object of interest, the image processing system 110 automatically analyzes images to determine a focal region in the image. The focal region represents a portion of the image that is to be preserved, emphasized, or displayed prominently when a modified image is generated. The image processing system 110 leverages metadata associated with an image to automatically determine one or more properties related to or descriptive of an item of interest within the image. These properties are then input to an object detection algorithm that automatically determines a portion of the image that contains the target object. In the example shown in FIG. 1, a focal region 115 is defined around a portion of the image 105 that contains the shoes. When the image 105 is modified for display via the webpage 122 or application 124, such as by cropping the image to display only a portion of the original image, the modifications are applied with respect to the focal region 115.

To process an image and define the focal region, the image processing system 110 accesses metadata associated with the image. The metadata can be attached to the image, for example as part of an image file that is uploaded to the image processing system 110. Alternatively, the image processing system 110 retrieves metadata from a metadata store maintained by the image processing system 110 or by another system. The metadata can be indexed in the metadata store based on, for example, an identifier of the particular image, an identifier of a set of images that includes the particular uploaded image, an identifier of the user who uploaded the image.

Figure 2:
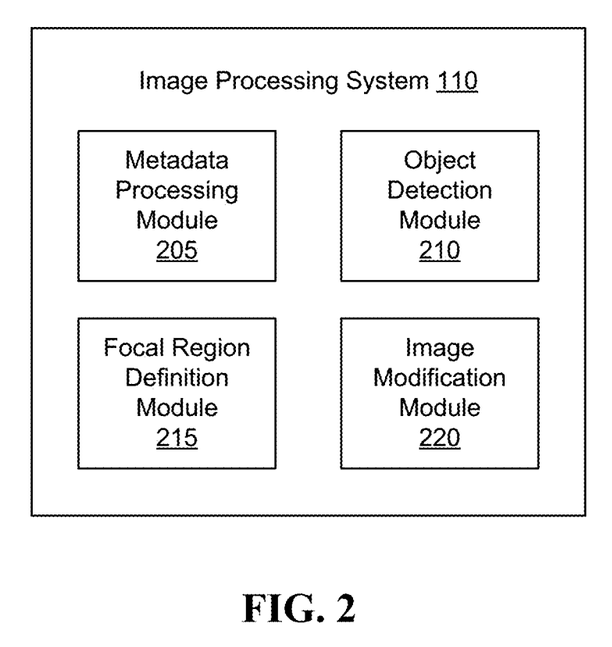
FIG. 2 is a block diagram illustrating components of an image processing system, according to some implementations.

FIG. 2 is a block diagram illustrating components of the image processing system 110. As shown in FIG. 2, an example implementation of the image processing system 110 includes a metadata processing module 205, an object detection module 210, a focal region definition module 215, and an image modification module 220. The image processing system 110 can include additional, fewer, or different modules, and functionality described herein can be divided differently between the modules. As used herein, the term "module" refers broadly to software components, firmware components, and/or hardware components. Accordingly, the modules 205, 210, 215, 220 could each be comprised of software, firmware, and/or hardware components implemented in, or accessible to, the image processing system 110. Together, the modules shown in FIG. 2 enable definition of focal regions in images that are uploaded to or accessed by the image processing system 110.

The metadata processing module 205 analyzes metadata associated with an image to derive information about a particular object depicted within the image. When an image is uploaded to the image processing system 110, the user who is uploading the image may provide textual descriptors, such as a title, description, category, or keyword tags, that are associated with the image or its context. For example, a merchant who is uploading an image of a product for sale via a website will often provide a title for the product (e.g., "Shoes," "Black Sneakers," or "Casual Black Kicks.") The merchant can further input a description to provide more detail about the product to potential customers. Continuing the example product of black sneakers for children, the merchant may add a description such as "Don't shy away from the color black—these lightweight kicks will keep you cool through all your summer adventures!" The merchant can further add keyword or category tags that facilitate searching, filtering, recommendations, or other related processes on a website or application. The category tags are selectable from a predefined taxonomy, in some implementations. For example, the merchant of children's sneakers may assign the taxonomic classification of "Apparel & Accessories>Shoes>Children's Shoes."

At least a portion of the metadata associated with an image can be analyzed by application of a natural language processing model that identifies object characteristics from the various text inputs. The natural language processing model can include statistical models, neural network-based models, and/or rule-based models, that perform functions such as part-of-speech tagging, lexical semantics, or relational semantics.

A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the natural language processing model can be a neural network with multiple input nodes that receive elements of or data derived from the text inputs. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer ("the output layer"), one or more nodes can produce a value classifying the input that, once the model is trained, can be used as a characteristic of an object in an image. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning, where the training data includes text data or data derived from textual metadata as input and a desired output, such as specified object characteristics. A representation of metadata associated with an image can be provided to the model. Output from the model can be compared to the desired output for that image (e.g., specified characteristics of an object in the image). Based on the comparison, the model can be modified, such as by changing weights between nodes of the neural network or parameters of the functions used at each node in the neural network (e.g., applying a loss function). After applying each of the portions of metadata in the training data and modifying the model in this manner, the model can be trained to evaluate new image data in order to predict characteristics of an object depicted in the image.

In an example implementation, the natural language processing model identifies any adjectives or adjective-noun phrases within the metadata. The adjectives or adjective-noun phrases can then be mapped against an existing dictionary of object characteristics to identify the object characteristics that are referenced in the set of metadata associated with a particular image. In another example, the natural language processing model includes one or more neural networks that are trained using a representation of image metadata as input and a set of object characteristics as output. The trained neural network is configured to receive a representation of metadata associated with a new image and generate one or more object characteristics by application of the trained model to the input representation.

In some implementations, the metadata processing module 205 uses a sequential analysis that analyzes particular types of metadata in a specified order, such that the output of one step in the sequence is used in a subsequent step in the sequence. For example, the metadata processing module 205 can first use a product title and/or category tags to determine a type of the object depicted in an image (e.g., "shoes"). The metadata processing module 205 then retrieves an ontology associated with the identified object type and processes the remaining metadata to identify characteristics that are defined within the retrieved ontology. For example, when the object type is "shoes," the ontology may define applicable characteristics as being a subtype of shoe (e.g., within predefined subtypes such as sneakers, pumps, or sandals) and color, and the additional metadata associated with the image can be processed to identify these particular characteristics. When the object type is instead "jewelry," the ontology may define applicable characteristics as being a subtype of jewelry (e.g., within predefined subtypes such as necklaces, earrings, or rings), material type (e.g., within predefined material types such as gold, silver, or beaded), color, and size.

Some implementations of the metadata processing module 205 apply rule-based models to the metadata, instead of or in addition to machine learning-based natural language models. For example, when an image is associated with a category tag that is selected from a predefined set of category tags, the metadata processing module 205 can apply a rule to use the category tag (or a portion thereof) as an object type characteristic.

The output of the metadata processing module 205 can include a list of one or more characteristics of at least one object depicted in the image. Depending on the type of image, the type of object depicted in the image, and/or the type of metadata associated with the image, as well as the content of the metadata, the characteristics output by the metadata processing module 205 can include any descriptive information of the object. For example, the object characteristics can include a category of the object (e.g., shoes), a type of the object (e.g., sneaker), color, size, shape, or texture.

In some implementations, the metadata processing module 205 additionally outputs one or more characteristics of the image itself. For example, images of wearable products that are being offered for sale may depict the object in context on a model—in which case the metadata processing module 205 labels the image as an "on-model" image—or may depict the object alone or on a display stand—in which case the metadata processing module 205 labels the image as an "off-model" image.

The object detection module 210 detects a location of an object in the image based on the characteristics output by the metadata processing module 205. The object detection module 210 can employ any of a variety of object detection or image segmentation algorithms that take one or more characteristics as input and produce, as output, information about a location in an image of an object that matches the input characteristics. The output information generated by the object detection module 210 can include, for example, coordinates of a bounding box around an object that matches the input characteristics, coordinates of another polygonal shape around the object, or labels for pixels in the image that identify the pixel as either belonging to the object or not belonging to the object.

The focal region definition module 215 defines a focal region within the image based on the location of the object output by the object detection module 210. The focal region, for example, can correspond to a region of the image that is coextensive with the identified location of the target object, a region of the image that is centered on and includes the identified location of the target object, a region of the image that includes a margin around the centered object, a region of the image that includes the target object and another item of interest, or a region of the image that includes the target object and other items in the image. The definition of a focal region, such as coordinates bounding the focal region, can be stored in association with the image for use by the image modification module 220.

Figures 3A, 3B, 3C:
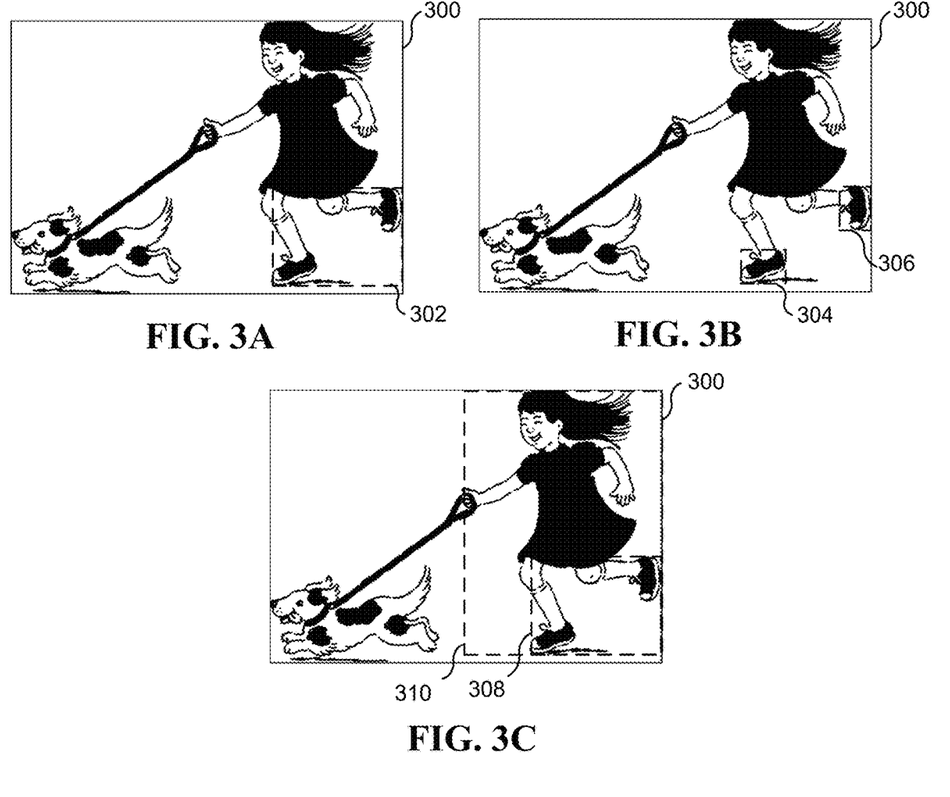
FIGS. 3A-3D illustrate example focal regions defined within images.
Figure 3D:
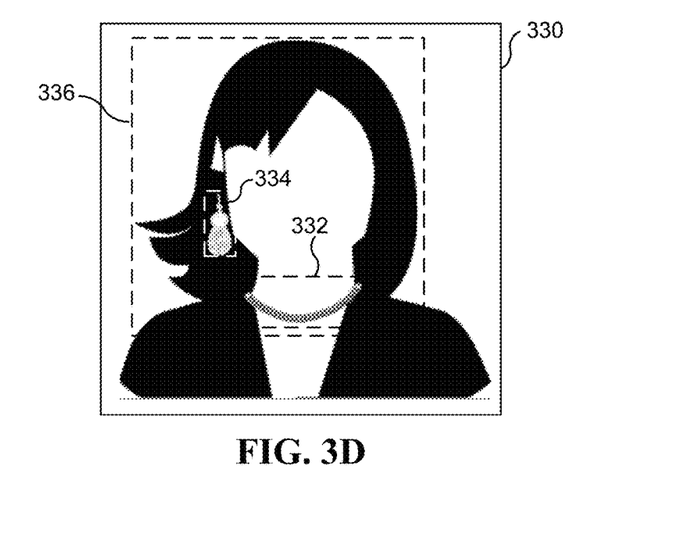

The focal region definition module 215 can define multiple focal regions in some images. For example, some images may depict multiple objects, and thus corresponding focal regions can be generated for each object. For other images, the focal region definition module 215 may generate multiple focal regions that each frame the same object in different ways. FIGS. 3A-5C illustrate various example focal regions that can be defined within the image of a child wearing sneakers while chasing after her dog. In FIG. 3A, for example, a single focal region 302 is defined around a portion of the image 300 that contains the child's shoes. FIG. 3B illustrates an example in which respective focal regions 304, 306 are defined for each of the shoes. FIG. 3C illustrates still another example, in which a first focal region 308 represents a portion of the image 300 that contains the shoes and a second focal region 310 represents a portion of the image that contains the whole child. In FIG. 3D, a different example image 330 that depicts a necklace and earrings worn by a model has three focal regions: a first focal region 332 around the necklace, a second focal region 334 around the earring, and a third focal region 336 that shows both the necklace and earring as well as the context of the products on the model's head.

When multiple focal regions are defined for a particular image, an implementation of the focal region definition module 215 applies a ranking to the focal regions. The rankings can be based on the image type or based on other images that are uploaded in association with the image. In an example, the focal region definition module 215 assigns a highest rank to the smallest focal region in the image and the lowest rank to the largest focal region. In another example, a user uploads two images of a product—one that is tagged or described as being a detailed image that shows details of the product and one that is tagged or described as a lifestyle image showing the product being worn by a model. When processing the example lifestyle image, the focal region definition module 215 defines a first focal region around the product itself and a second focal region around the product and at least a portion of the model. Because the lifestyle image is likely intended to show an example use or context of the product while the detailed image provides a detailed view of the product itself, the focal region definition module 215 in this example may rank the second focal region in the lifestyle image (showing context of the model) more highly than the first focal region.

The focal region definition module 215 can display a representation of the determined focal region(s) of an image to the user who uploaded the image. For example, the original image is displayed with an outline defining the focal region, giving the user the opportunity to provide feedback by approving or modifying the focal region before the image upload workflow is finalized. If the user does not approve of the focal region, the user can manipulate the outline to, for example, increase or decrease the size of the focal region, adjust the framing of the object within the focal region, or move the focal region to a different object within the image. Users can also add focal regions to or remove focal regions from an image in some implementations, or change the ranking of focal regions.

In some implementations, the focal region definition module 215 stores a difference between originally defined focal regions and any focal region modifications received from a user. The stored differences can be used to retrain the object detection model applied by the object detection module 210.

The image modification module 220 generates modified images for delivery and presentation via a webpage or application, based on the focal region. In some implementations, the image modification module 220 generates modified images at a time of webpage or application access, such as in response to a request by a user's browser to display a webpage containing an image slot for the image. In these circumstances, the image modification module 220 determines parameters of the image slot and modifies the original image such that the modified image conforms to the parameters while containing the entirety of at least one focal region of the original image. In other implementations, the image modification module 220 generates and stores modified images, in advance of any webpage or application access. For example, the image modification module 220 generates and stores a set of modified images with a few different, commonly used aspect ratios. The modified images can then be retrieved from storage and presented when a webpage or application is accessed. Alternatively, the image modification module 220 further modifies one of the stored images, such as a stored image that has properties closest to those of an image slot on a requested webpage or application, before sending the further modified image for presentation on the webpage or application. Still other implementations of the image modification module 220 define the manner in which an image will be modified when a webpage or application is accessed, but does not store modified images. For example, the image modification module 220 stores the coordinates of a bounding box to which the image will be cropped when delivered to a webpage or application.

Figure 4A:
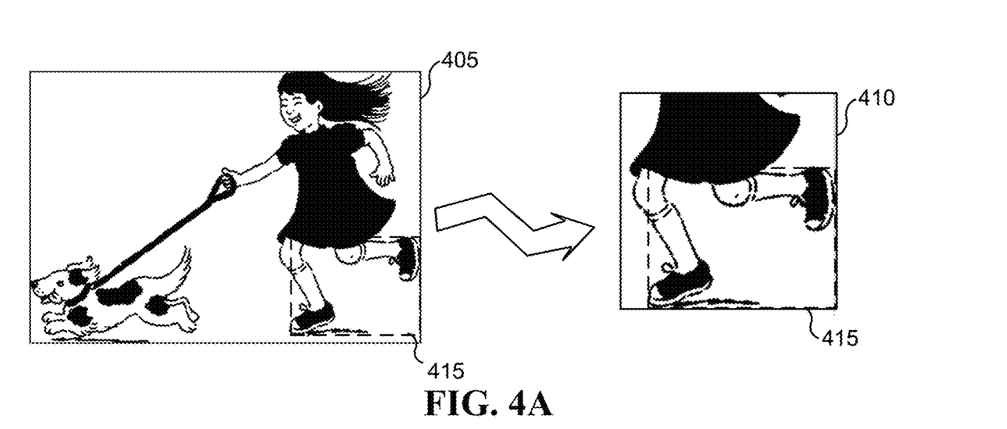
FIGS. 4A-4C illustrate example modifications applied to images based on focal regions.
Figure 4B:
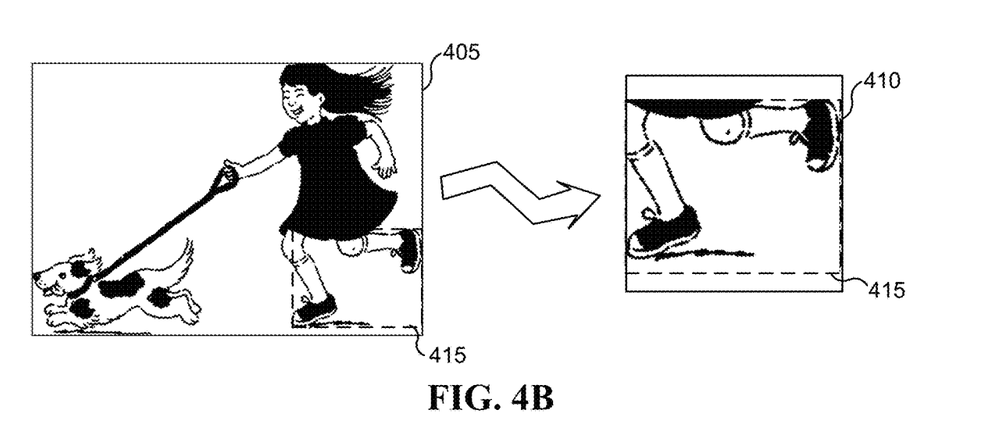

One example type of modification applied by the image modification module 220 includes cropping an original image to fit a specified aspect ratio. The image modification module 220 applies a cropping window that has the specified aspect ratio while fully containing the focal region within the window. For example, as illustrated in FIG. 4A, an original image 405 is cropped to fit an image slot 410 that has a different aspect ratio than a focal region 415 in the image. The focal region 415 is fully contained within the cropped image Another example type of modification applies a zoom operation to the image to generate a modified image that fills a bounding box of a specified size. For example, rather than cropping the image to fit the image slot 410 as shown in FIG. 4A, a modified version of the image can be generated by resizing the focal region to fit the image slot 410 as illustrated in FIG. 4B. Optionally, if the focal region has a different aspect ratio than the image slot 410 (as illustrated for example in FIG. 4B), the image modification module 220 can add a solid color fill on one or more sides of the focal region to generate a modified image with the correct aspect ratio for the image slot 410.

Figure 4C:
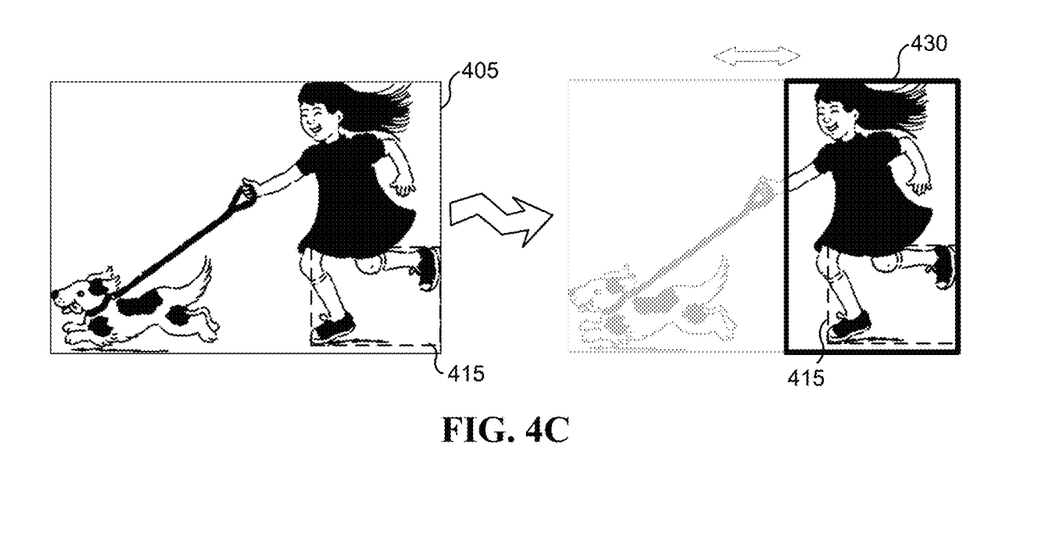

Another example type of modification includes defining an initial window of the image for display in a viewport of a pannable image slot. For example, a webpage can include an image slot that fits a first aspect ratio, but a viewport through which only a portion of the image can be displayed at a given time. A user can interact with the image in the viewport to pan to different regions of the image. FIG. 4C illustrates an example in which the original image 405 is displayed within an image slot that has a viewport 430, such that an initial portion of the image is displayed within the viewport 430 but the image can be panned left or right to view additional portions of the image. The initial window of the image that is displayed in the viewport 430 is a portion of the image that contains the focal region 415.

Some image modifications are applied based on a theme of the webpage or application in which the image is to be displayed. The theme specifies a manner in which an image is to be displayed in one or more image slots, such as gravity to be applied to the image, fill type of the image, or object location within the modified image. For example, the webpage theme specifies how an image should be cropped or zoomed, and/or whether a solid fill color should be applied on one or more sides of the image, when the focal region does not have the same aspect ratio as the image slot. In another example, the webpage theme of a first webpage specifies that the image should be modified such that a center of the focal region will be positioned at or near a center of the image slot, while the webpage theme of a second webpage specifies that a center of the focal region should be positioned at an intersection point of a "rule of thirds" grid.

Figure 5:
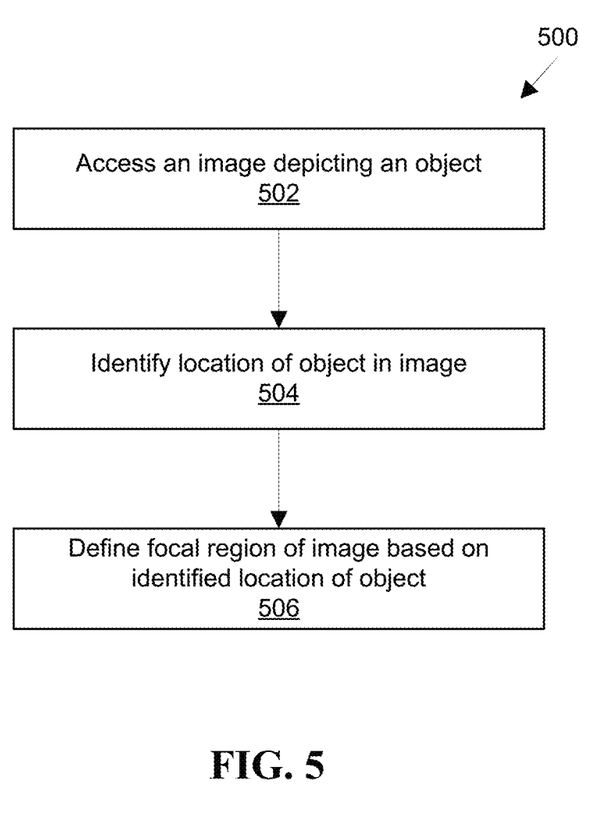
FIG. 5 is a flowchart illustrating a process for automatically defining focal regions of images for delivery and presentation on a webpage or application, according to some implementations.

FIG. 5 is a flowchart illustrating a process 500 for automatically defining focal regions of images for delivery and presentation on a webpage or application, according to some implementations. The process 500 can be performed by a computing device, such as the image processing system 110. Other implementations of the process 500 can include additional, fewer, or different steps.

At step 502, the computing device accesses an image depicting a particular object. For example, the computing device receives an image that is uploaded by a user. The image can be associated with metadata, including metadata that includes a textual description of the image or the particular object depicted in the image.

At step 504, the computing device identifies a location of the particular object within the image. In some implementations, the location of the particular object is identified based on the metadata.

At step 506, the computing device defines a focal region of the image, based on the identified location of the particular object within the image. The focal region can be used to modify the image for delivery and presentation on a webpage or software application.

An Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 6:
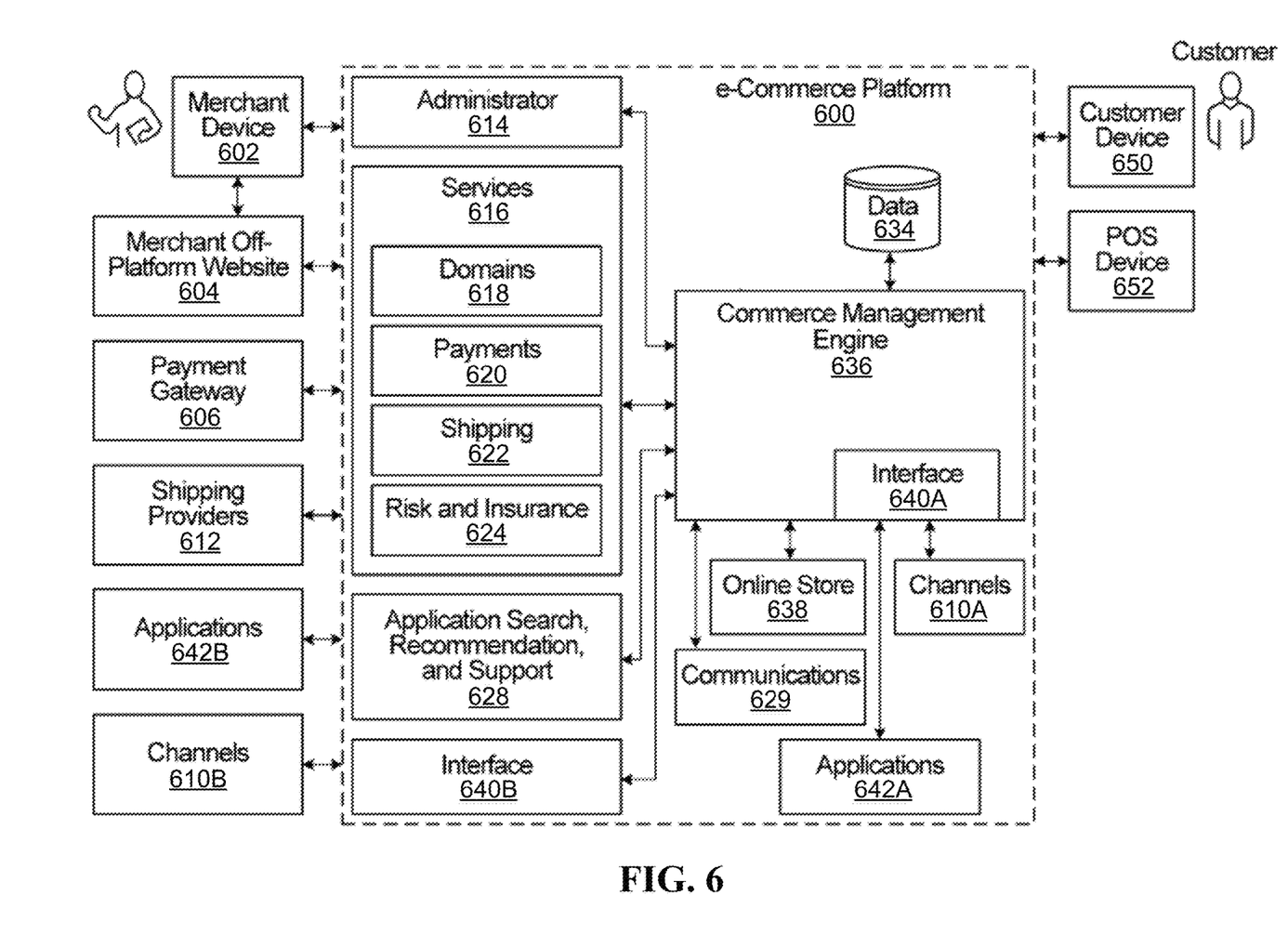
FIG. 6 illustrates an example of an e-commerce platform.

FIG. 6 illustrates an example e-commerce platform 600, according to one embodiment. The e-commerce platform 600 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products.

Further, while the disclosure throughout refers to 'merchants' and 'customers', and describes their roles as such, the e-commerce platform 600 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 600 for potential use in marketing and selling products, and the like), a service provider user (e.g., a shipping provider 612, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 600 provides merchants with online services/facilities to manage their business. The facilities described herein are shown implemented as part of the platform 600 but could also be configured separately from the platform 600, in whole or in part, as stand-alone services. Furthermore, such facilities may, in some embodiments, may, additionally or alternatively, be provided by one or more providers/entities.

In the example of FIG. 6, the facilities are deployed through a machine, service or engine that executes computer software, modules, program codes, and/or instructions on one or more processors which, as noted above, may be part of or external to the platform 600. Merchants may utilize the e-commerce platform 600 for enabling or managing commerce with customers, such as by implementing an e-commerce experience with customers through an online store 638, applications 642A-B, channels 610A-B, and/or through point of sale (POS) devices 652 in physical locations (e.g., a physical storefront or other location such as through a kiosk, terminal, reader, printer, 6D printer, and the like). A merchant may utilize the e-commerce platform 600 as a sole commerce presence with customers, or in conjunction with other merchant commerce facilities, such as through a physical store (e.g., brick-and-mortar retail stores), a merchant off-platform website 604 (e.g., a commerce Internet website or other internet or web property or asset supported by or on behalf of the merchant separately from the e-commerce platform 600), an application 642B, and the like. However, even these 'other' merchant commerce facilities may be incorporated into or communicate with the e-commerce platform 600, such as where POS devices 652 in a physical store of a merchant are linked into the e-commerce platform 600, where a merchant off-platform website 604 is tied into the e-commerce platform 600, such as, for example, through 'buy buttons' that link content from the merchant off platform website 604 to the online store 638, or the like.

The online store 638 may represent a multi-tenant facility comprising a plurality of virtual storefronts. In embodiments, merchants may configure and/or manage one or more storefronts in the online store 638, such as, for example, through a merchant device 602 (e.g., computer, laptop computer, mobile computing device, and the like), and offer products to customers through a number of different channels 610A-B (e.g., an online store 638; an application 642A-B; a physical storefront through a POS device 652; an electronic marketplace, such, for example, through an electronic buy button integrated into a website or social media channel such as on a social network, social media page, social media messaging system; and/or the like). A merchant may sell across channels 610A-B and then manage their sales through the e-commerce platform 600, where channels 610A may be provided as a facility or service internal or external to the e-commerce platform 600. A merchant may, additionally or alternatively, sell in their physical retail store, at pop ups, through wholesale, over the phone, and the like, and then manage their sales through the e-commerce platform 600. A merchant may employ all or any combination of these operational modalities. Notably, it may be that by employing a variety of and/or a particular combination of modalities, a merchant may improve the probability and/or volume of sales. Throughout this disclosure the terms online store 638 and storefront may be used synonymously to refer to a merchant's online e-commerce service offering through the e-commerce platform 600, where an online store 638 may refer either to a collection of storefronts supported by the e-commerce platform 600 (e.g., for one or a plurality of merchants) or to an individual merchant's storefront (e.g., a merchant's online store).

In some embodiments, a customer may interact with the platform 600 through a customer device 650 (e.g., computer, laptop computer, mobile computing device, or the like), a POS device 652 (e.g., retail device, kiosk, automated (self-service) checkout system, or the like), and/or any other commerce interface device known in the art. The e-commerce platform 600 may enable merchants to reach customers through the online store 638, through applications 642A-B, through POS devices 652 in physical locations (e.g., a merchant's storefront or elsewhere), to communicate with customers via electronic communication facility 629, and/or the like so as to provide a system for reaching customers and facilitating merchant services for the real or virtual pathways available for reaching and interacting with customers.

In some embodiments, and as described further herein, the e-commerce platform 600 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 600 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 600, merchant devices 602, payment gateways 606, applications 642A-B, channels 610A-B, shipping providers 612, customer devices 650, point of sale devices 652, etc. In some implementations, the processing facility may be or may include one or more such computing devices acting in concert. For example, it may be that a plurality of co-operating computing devices serves as/to provide the processing facility. The e-commerce platform 600 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 638) is provided as a service, and is centrally hosted (e.g., and then accessed by users via a web browser or other application, and/or through customer devices 650, POS devices 652, and/or the like). In some embodiments, elements of the e-commerce platform 600 may be implemented to operate and/or integrate with various other platforms and operating systems.

In some embodiments, the facilities of the e-commerce platform 600 (e.g., the online store 638) may serve content to a customer device 650 (using data 634) such as, for example, through a network connected to the e-commerce platform 600. For example, the online store 638 may serve or send content in response to requests for data 634 from the customer device 650, where a browser (or other application) connects to the online store 638 through a network using a network communication protocol (e.g., an internet protocol). The content may be written in machine readable language and may include Hypertext Markup Language (HTML), template language, JavaScript, and the like, and/or any combination thereof.

In some embodiments, online store 638 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 638 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 638, such as through blogs, articles, landing pages, and the like, as well as configure navigation menus. Merchants may upload images (e.g., for products), video, content, data, and the like to the e-commerce platform 600, such as for storage by the system (e.g., as data 634). In some embodiments, the e-commerce platform 600 may provide functions for manipulating such images and content such as, for example, functions for resizing images, associating an image with a product, adding and associating text with an image, adding an image for a new product variant, protecting images, and the like.

As described herein, the e-commerce platform 600 may provide merchants with sales and marketing services for products through a number of different channels 610A-B, including, for example, the online store 638, applications 642A-B, as well as through physical POS devices 652 as described herein. The e-commerce platform 600 may, additionally or alternatively, include business support services 616, an administrator 614, a warehouse management system, and the like associated with running an on-line business, such as, for example, one or more of providing a domain registration service 618 associated with their online store, payment services 620 for facilitating transactions with a customer, shipping services 622 for providing customer shipping options for purchased products, fulfillment services for managing inventory, risk and insurance services 624 associated with product protection and liability, merchant billing, and the like. Services 616 may be provided via the e-commerce platform 600 or in association with external facilities, such as through a payment gateway 606 for payment processing, shipping providers 612 for expediting the shipment of products, and the like.

In some embodiments, the e-commerce platform 600 may be configured with shipping services 622 (e.g., through an e-commerce platform shipping facility or through a third-party shipping carrier), to provide various shipping-related information to merchants and/or their customers such as, for example, shipping label or rate information, real-time delivery updates, tracking, and/or the like.

Implementation in an E-Commerce Platform

Figure 7:
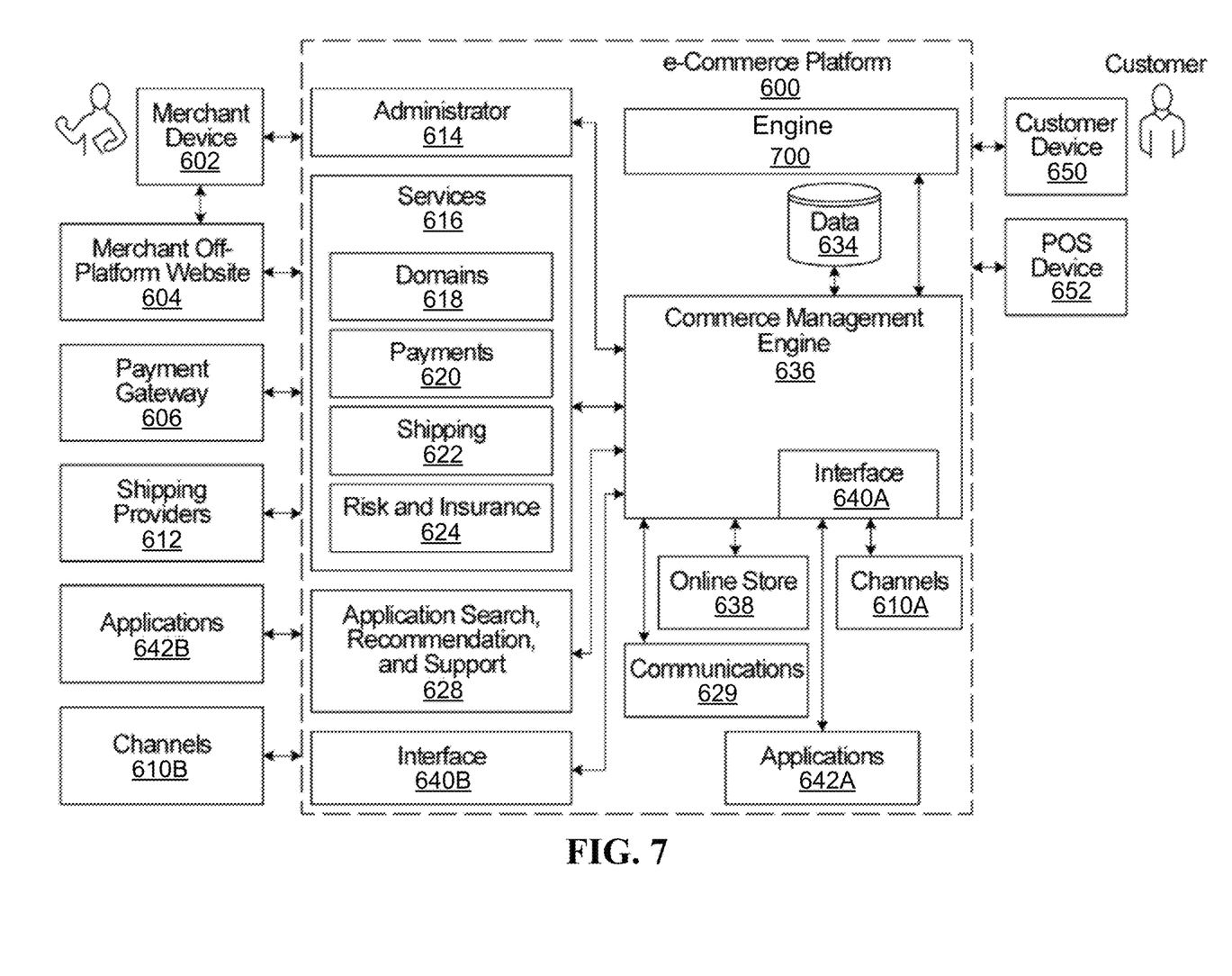
FIG. 7 illustrates another example implementation of an e-commerce platform.

The functionality described herein may be used in commerce to provide improved customer or buyer experiences. The e-commerce platform 600 could implement the functionality for any of a variety of different applications, examples of which are described elsewhere herein. FIG. 7 illustrates the e-commerce platform 600 of FIG. 6 but including an engine 700. The engine 700 is an example of a computer-implemented system that implements the functionality described herein for use by the e-commerce platform 600, the customer device 650 and/or the merchant device 602.

Although the engine 700 is illustrated as a distinct component of the e-commerce platform 600 in FIG. 7, this is only an example. An engine could also or instead be provided by another component residing within or external to the e-commerce platform 600. In some embodiments, either or both of the applications 642A-B provide an engine that implements the functionality described herein to make it available to customers and/or to merchants. Furthermore, in some embodiments, the commerce management engine 636 provides that engine. However, the location of the engine 700 is implementation specific. In some implementations, the engine 700 is provided at least in part by an e-commerce platform, either as a core function of the e-commerce platform or as an application or service supported by or communicating with the e-commerce platform. Alternatively, the engine 700 may be implemented as a stand-alone service to clients such as a customer device 650 or a merchant device 602. In addition, at least a portion of such an engine could be implemented in the merchant device 602 and/or in the customer device 650. For example, the customer device 650 could store and run an engine locally as a software application.

The engine 700 could implement at least some of the functionality described herein. Although the embodiments described herein may be implemented in association with an e-commerce platform, such as (but not limited to) the e-commerce platform 600, the embodiments described herein are not limited to e-commerce platforms.

Computer System

Figure 8:
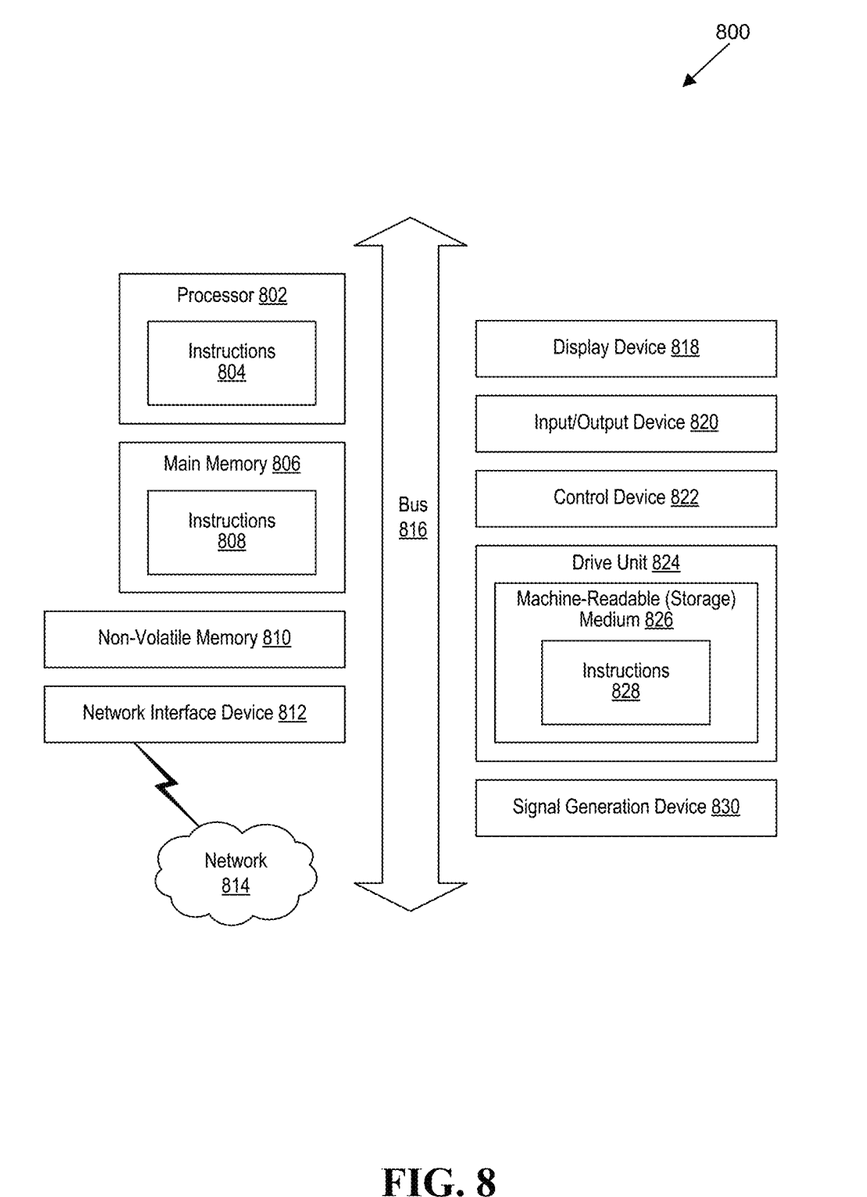
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, video display device 818, an input/output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementation, the computer system 800 can be an embedded computer system, a system-on-chip (SOC), a single-board computer system (SBC) or a distributed system such as a mesh of computer systems or include one or more cloud components in one or more networks. Where appropriate, one or more computer systems 800 can perform operations in real-time, near real-time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer-implemented method comprising:
    receiving a request for displaying, in an image slot of a webpage, an image that depicts a particular object;
    identifying a location of the particular object within the image;
    defining, based on the identified location of the particular object within the image, a focal region of the image; and
    serving a modified version of the image in the image slot of the webpage, wherein the modified version of the image contains an entirety of the focal region.

2. The method of claim 1, wherein the image depicting the particular object is associated with metadata, and wherein the location of the particular object within the image is identified based on the metadata.

3. The method of claim 2, wherein the metadata includes text related to the particular object, and wherein identifying the location of the particular object within the image includes:
    analyzing the metadata using a natural language processing model that is configured to output a characteristic of the particular object based on the text,
    wherein the characteristic of the particular object is used to identify the location.

4. The method of claim 3, further comprising:
    determining the particular object based on the metadata, wherein identifying the location of the particular object within the image includes identifying a portion of the image that matches the characteristic of the particular object.

5. The method of claim 1, wherein identifying the location of the particular object within the image includes applying one or more object detection techniques to the image.

6. The method of claim 1, wherein the request specifies an aspect ratio different from an aspect ratio of the image, and wherein the method further comprises: and
    generating the modified version of the image having the specified aspect ratio and containing the entirety of the focal region.

7. The method of claim 1, further comprising:
    generating the modified version of the image based on a webpage theme of the webpage that includes the image slot.

8. The method of claim 1, further comprising:
    detecting a user access of the webpage, wherein the modified version of the image in the image slot of the webpage is served in response to the user access to the webpage.

9. The method of claim 1, further comprising:
    generating one or more modified images by cropping the image to a respective aspect ratio, wherein the focal region is fully contained within each of the modified images;
    storing the one or more modified images; and
    detecting a user access of the webpage that includes the image slot with a specified aspect ratio,
    wherein serving the modified version of the image comprises serving a modified image of the one or more modified images based on a correspondence between the respective aspect ratio of the served modified image and the specified aspect ratio of the image slot.

10. The method of claim 1, further comprising:
    defining a bounding box around a portion of the image such that the focal region is fully contained within the bounding box; and
    storing the definition of the bounding box in association with the image for use in cropping the image to a size of the bounding box.

11. The method of claim 1, further comprising:
    defining an initial window within the image for display in a viewport of a pannable image slot, the initial window containing at least a portion of the focal region; and
    storing the definition of the initial window in association with the image.

12. The method of claim 1, further comprising:
    applying a zoom operation to the image to generate the modified version of the image to fill a bounding box; and
    storing the modified version of the image.

13. The method of claim 1, wherein identifying the location of the particular object within the image includes applying an object detection model to the image, and wherein the method further comprises:
    sending for display to a user, a preview image that identifies the focal region;
    receiving feedback from the user regarding a position of the focal region relative to the particular object; and
    retraining the object detection model using the feedback.

14. A non-transitory computer readable storage medium storing executable instructions, execution of which by a processor causing the processor to:
    receive a request for displaying, in an image slot of a webpage, an image that depicts a particular object;
    identify a location of the particular object within the image;
    define based on the identified location of the particular object within the image, a focal region of the image; and
    serve a modified version of the image in the image slot of the webpage, wherein the modified version of the image contains an entirety of the focal region.

15. The non-transitory computer readable storage medium of claim 14:
    wherein the image depicting the particular object is associated with metadata;
    wherein the location of the particular object within the image is identified based on the metadata;
    wherein the metadata includes text related to the particular object; and
    wherein identifying the location of the particular object within the image includes:
        analyzing the metadata using a natural language processing model that is configured to output a characteristic of the particular object based on the text,
        wherein the characteristic of the particular object is used to identify the location.

16. The non-transitory computer readable storage medium of claim 14, wherein identifying the location of the particular object within the image includes applying one or more object detection techniques to the image.

17. The non-transitory computer readable storage medium of claim 14, wherein:
the request specifies an aspect ratio different from an aspect ratio of the image; and
execution of the instructions further causes the processor to generate the modified version of the image having the specified aspect ratio and containing the entirety of the focal region.

18. The non-transitory computer readable storage medium of claim 14, wherein execution of the instructions further causes the processor to:
generating one or more modified images by cropping the image to a respective aspect ratio, wherein the focal region is fully contained within each of the modified images;
storing the one or more modified images; and
detecting a user access of the webpage that includes the image slot with a specified aspect ratio,
wherein serving the modified version of the image comprises serving a modified image of the one or more modified images based on a correspondence between the respective aspect ratio of the served modified image and the specified aspect ratio of the image slot.

19. The non-transitory computer readable storage medium of claim 14, wherein identifying the location of the particular object within the image includes applying an object detection model to the image, and wherein execution of the instructions further causes the processor to:
send for display to a user, a preview image that identifies the focal region;
receive feedback from the user regarding a position of the focal region relative to the particular object; and
retrain the object detection model using the feedback.

20. A system comprising:
at least one hardware processor; and
at least one non-transitory memory storing instructions, which, when executed by the at least one hardware processor, cause the system to:
receive a request for displaying, in an image slot of a webpage, an image that depicts a particular object;
identify a location of the particular object within the image;
define based on the identified location of the particular object within the image, a focal region of the image; and
serve a modified version of the image in the image slot of the webpage, wherein the modified version of the image contains an entirety of the focal region.

\* \* \* \* \*